United States Patent
Mills et al.

(10) Patent No.: US 12,339,452 B2
(45) Date of Patent: Jun. 24, 2025

(54) HOLOGRAPHIC WAVEGUIDE

(71) Applicant: GOOGLE LLC, Mountain View, CA (US)

(72) Inventors: Jackie Lynn Mills, Waterloo (CA); Shreyas Potnis, Waterloo (CA); Timothy Paul Bodiya, Toronto (CA); Stefan Alexander, Elmira (CA)

(73) Assignee: GOOGLE LLC, Mountain View, CA (US)

( * ) Notice: Subject to any disclaimer, the term of this patent is extended or adjusted under 35 U.S.C. 154(b) by 561 days.

(21) Appl. No.: 17/635,858

(22) PCT Filed: Aug. 17, 2020

(86) PCT No.: PCT/CA2020/051127
§ 371 (c)(1),
(2) Date: Feb. 16, 2022

(87) PCT Pub. No.: WO2021/030908
PCT Pub. Date: Feb. 25, 2021

(65) Prior Publication Data
US 2022/0299772 A1   Sep. 22, 2022

Related U.S. Application Data

(60) Provisional application No. 62/888,129, filed on Aug. 16, 2019.

(51) Int. Cl.
*G02B 27/01*   (2006.01)
*G02B 1/04*   (2006.01)
*G02B 27/00*   (2006.01)

(52) U.S. Cl.
CPC ......... *G02B 27/0172* (2013.01); *G02B 1/045* (2013.01); *G02B 27/0081* (2013.01);
(Continued)

(58) Field of Classification Search
CPC ........ G02B 27/00; G02B 27/01; G02B 27/09; G02B 27/0101; G02B 27/0944;
(Continued)

(56) References Cited

U.S. PATENT DOCUMENTS

| | | | |
|---|---|---|---|
| 7,747,113 B2 | 6/2010 | Mukawa et al. |
| 8,885,112 B2 | 11/2014 | Popovich et al. |
| 9,465,215 B2 | 10/2016 | Richards et al. |

(Continued)

FOREIGN PATENT DOCUMENTS

| | | |
|---|---|---|
| JP | 2004219497 A | 8/2004 |
| JP | 2010014780 A | 1/2010 |
| WO | 2018031634 A1 | 2/2018 |

OTHER PUBLICATIONS

First Examination Report mailed Jun. 9, 2022 for Indian Application No. 202247007904, 5 pages.
(Continued)

*Primary Examiner* — Sultan Chowdhury

(57) ABSTRACT

A waveguide including at least a first photopolymer layer and a second photopolymer layer having a barrier layer therebetween and a first transparent layer and second transparent layer overlaying the first and second photopolymer layers, respectively. The waveguide can further include at least one holographic incoupler and at least one holographic outcoupler, each configured to be responsive to light within a first waveband and unresponsive to light outside of the first waveband, and further configured to be transmissive or reflective.

20 Claims, 7 Drawing Sheets

(52) U.S. Cl.
CPC ............... *G02B 2027/0125* (2013.01); *G02B 2027/0174* (2013.01); *G02B 2027/0178* (2013.01)

(58) Field of Classification Search
CPC ............ G02B 27/0037; G02B 27/0056; G02B 27/0081; G02B 27/103; G02B 27/42; G02B 27/44; G02B 27/106; G02B 27/4205; G02B 1/045; G02B 1/115; G02B 1/116; G02B 2027/0107; G02B 2027/0112; G02B 2027/0174; G02B 2027/0178; G02B 2027/0179
See application file for complete search history.

(56) References Cited

U.S. PATENT DOCUMENTS

| | | | |
|---|---|---|---|
| 10,241,330 B2* | 3/2019 | Popovich | G02F 1/29 |
| 2006/0228073 A1 | 10/2006 | Mukawa | |
| 2017/0235142 A1* | 8/2017 | Wall | G02B 5/26 |
| | | | 359/633 |
| 2017/0285349 A1 | 10/2017 | Ayres et al. | |
| 2018/0143449 A1 | 5/2018 | Popovich et al. | |
| 2018/0373043 A1 | 12/2018 | Alexander et al. | |
| 2019/0056593 A1 | 2/2019 | Bablumyan | |
| 2019/0101760 A1 | 4/2019 | Ayres et al. | |
| 2019/0101761 A1 | 4/2019 | Ihmels | |
| 2019/0179149 A1* | 6/2019 | Curtis | G02B 27/0176 |
| 2019/0187465 A1 | 6/2019 | Erler et al. | |
| 2021/0157401 A1* | 5/2021 | Abele | G02B 27/0944 |
| 2021/0231986 A1* | 7/2021 | Oh | G02B 30/40 |

OTHER PUBLICATIONS

International Preliminary Report on Patentability mailed Mar. 3, 2022 for International Application No. PCT/CA2020/051127, 7 pages.
Extended Eurpoean Search Report mailed Jun. 28, 2023 for EP Application No. 20853812.4.
Translation of Chinese Notification of First Office Action mailed Mar. 27, 2024 for CN Application No. 202080056936.X, 33 pages.
Translation of Korean Office Action mailed Mar. 25, 2024 for KR Application No. 10-2022-7005434, 18 pages.
Notice of Allowance mailed Apr. 23, 2024 for IN Application No. IN202247007904, 2 pages.
Ditcovski, R. et al. "Full-Color Optical Combiner Based on Multilayered Metasurface Design", https://www.spiedigitallibrary.org/conference-proceedings-of-spie/10942/109420S/Full-color-optical-combiner-based-on-multilayered-metasurface-design/10.1117/12.2510273. short, In Advances in Display Technologies IX, International Society for Optics and Photonics, vol. 10942, Mar. 2019, 3 pages.
International Search Report and Written Opinion issued Oct. 2, 2020 for corresponding International Application No. PCT/CA2020/051127, 12 pages.
English translation of Japanese Office Action mailed Mar. 14, 2023 for JP Application No. 2022509724, 5 pages.
Communication pursuant to Rules 70(2) and 70a(2) EPC mailed Jul. 18, 2023 for EP Application No. 20853812.4, 1 page.
Translation of Allowance of Patent mailed Nov. 27, 2024 for KR Application No. 10-2022-7005434, 4 pages.
Communication pursuant to Article 94(3) EPC mailed Feb. 5, 2025 for EP Application No. 20853812.4, 5 pages.

\* cited by examiner

HOLOGRAPHIC WAVEGUIDE

CROSS-REFERENCE TO RELATED APPLICATIONS

The present application is a U.S. National Stage under 35 U.S.C. § 371 of International Patent Application Serial No. PCT/CA2020/051127, entitled "HOLOGRAPHIC WAVEGUIDE" and filed on 17 Aug. 2020, which claims priority to U.S. Provisional Application No. 62/888,129, entitled "Waveguides and Methods of Manufacturing Waveguides" and filed on 16 Aug. 2019, the entireties of which are incorporated by reference herein.

BACKGROUND

A waveguide is an optical element that directs light to travel within a volume of the waveguide by total internal reflection (TIR). That is, light within the waveguide which impinges on a boundary of the waveguide at an angle within a range of angles will be reflected back into the waveguide, and thus stay within the volume of the waveguide. A waveguide typically includes an incoupler, which receives light from a light source and redirects the received light into the volume of the waveguide at an angle within the range of angles required for total internal reflection.

A waveguide can also include an outcoupler, which receives light from within the waveguide and redirects the light to travel at an angle outside of the range of angles required for total internal reflection. Thus, light traveling within the waveguide which impinges on the outcoupler can be redirected to exit the volume of the waveguide.

Waveguides can be combined with or incorporated into a transparent carrier material to form an optical combiner to allow light from the environment outside the waveguide to travel through the waveguide and to be "combined" with light traveling within the waveguide. A wearable heads-up display device (WHUD), configured to be worn by a user such that the optical combiner is positioned in front of the user's eyes, allows an image represented by the light within the waveguide to be projected to a user of the WHUD as an image overlaying the environment viewed by a user through the WHUD, the resulting composite view is also known as augmented reality (AR).

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Waveguides can be formed of layers of photopolymers bonded together, which can further be bonded to layers of other materials in order to form a stack of layers with optical properties that facilitate the propagation of light within the waveguide. Certain photopolymers can be exposed to specific wavelengths and angles of light to cause interference patterns to form in the photopolymer. These interference patterns are referred to as "holograms" and can be configured to form a wavelength-sensitive grating in the photopolymer layer. Holograms formed in a waveguide selectively transmit, reflect, or redirect light having wavelengths within narrow wavebands of light. Such holograms are used as incouplers or outcouplers for waveguides due to the efficiency with which holograms can direct light into a single diffraction order and because holograms function similar to a multi-lens system but can be implemented on a plane, thus reducing the bulk of a waveguide.

FIGS. 1-13 illustrate example implementations of waveguides employing holographic incouplers to selectively guide light within particular wavebands into the waveguide and holographic outcouplers to guide the light out of the waveguide. The holographic incouplers and outcouplers can be configured to be reflective or transmissive, resulting in light within the waveguide being directed along different optical paths within the waveguide before being directed out of the waveguide, typically towards a user's eye. In order for the waveguides described herein to be utilized as part of a WHUD, the waveguides are coupled to or integrated into a transparent carrier material to form an optical combiner, which can be implemented as a lens-type structure held by a frame in front of a user's eyes to allow displaying of images to a user such that the images appear to overlay the environment visible to the user through the optical combiner.

Figure 1:
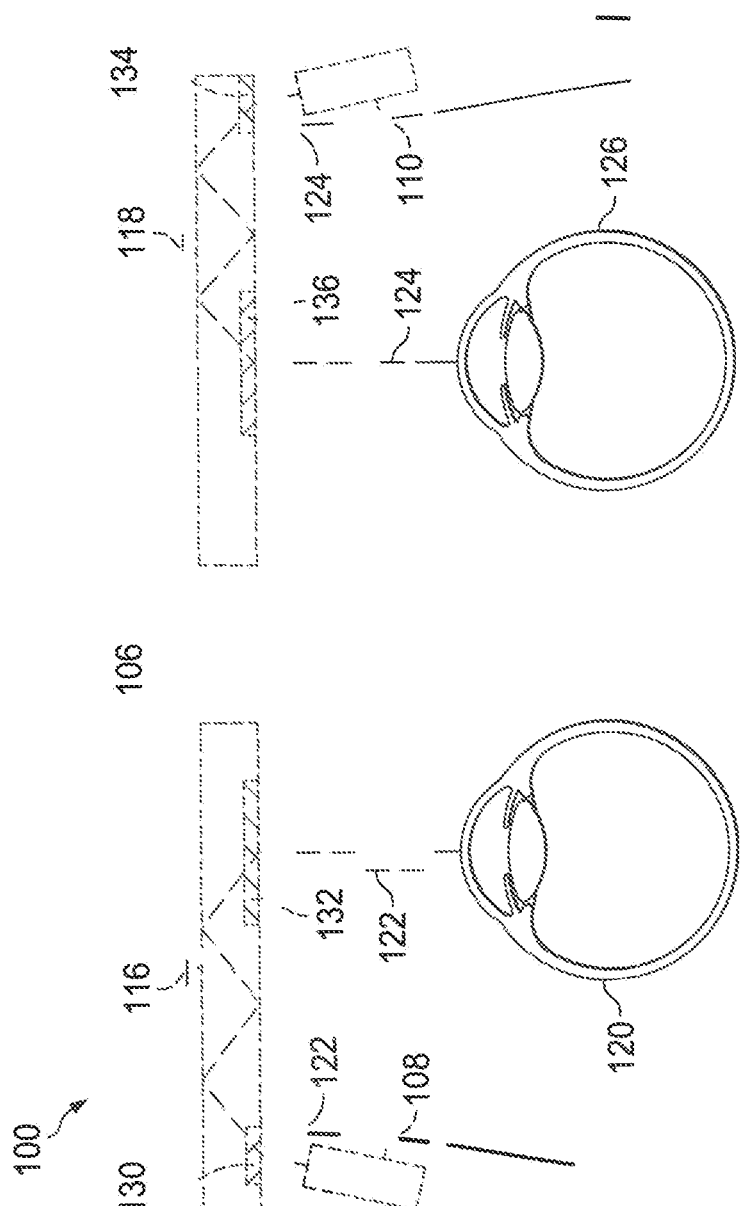
FIG. 1 is a top cutaway schematic view of a wearable heads-up display with optical combiners housing waveguides in accordance with some embodiments.

FIG. 1 illustrates a top cutaway schematic view of a WHUD 100 employing waveguides 116, 118. WHUD 100 includes a first arm 102 to be positioned on a first side of a head of a user, a second arm 104 to be positioned on a second side of a head of a user, and a front frame 106 to be positioned on a front side of a head of a user (i.e., in front of a user's eye(s)). Front frame 106 is coupled to each of the first arm 102 and the second arm 104, for example, by a hinge. The frame 106 represented in FIG. 1 can be configured to have a shape similar to eyeglasses such that the waveguides are supported underneath the portion of the frame 106 shown. In WHUD 100, each of waveguides 116 and 118 can be carried by a transparent optical carrier so as to form an optical combiner or "lens". Such a lens can be planar or curved. The optical combiner can also be configured to provide prescription light correction for a user (that is, applies an optical power to light which passes therethrough) or non-prescription (that is, does not apply an optical power to light which passes therethrough).

The first arm 102 includes a first light engine 108, and the second arm 104 includes a second light engine 110. The first and second light engines 108, 110 can be housed within or coupled to the first and second arms 102, 104, respectively. The front frame 106 is configured to support a first waveguide 116 and a second waveguide 118. The first and second waveguides 116, 118 can be housed within or coupled to the front frame 106.

The first light engine 108 is configured to output a first display light 122 representative of display content (e.g., images or video content) to be viewed by a user. The first display light 122 is redirected by the first waveguide 116 towards a first eye 120 of the user, such that the user can see the display content. In the case of WHUD 100, the first waveguide 116 includes a waveguide combiner which includes an incoupler 130 and an outcoupler 132. The first display light 122 from the first light engine 108 impinges on the incoupler 130 and is redirected into first waveguide 116, where the first display light 122 is guided through the waveguide by TIR. Subsequently, the first display light 122 in waveguide 116 impinges on outcoupler 132, which redirects first display light 122 out of waveguide 116 and towards a first eye 120 of a user.

Similarly, second waveguide 118 includes an incoupler 134 and an outcoupler 136. A second display light 124 from the second light engine 110 impinges on incoupler 134 and is redirected into second waveguide 118, where second display light 124 is guided through the waveguide 118 by total internal reflection. Subsequently, second display light 124 in second waveguide 118 impinges on outcoupler 136, which redirects second display light 124 out of the waveguide 118 and towards a second eye 126 of a user.

Further, WHUD 100 as illustrated in FIG. 1 is a binocular display, in that first light engine 108 and first waveguide 116 are provided which present first display light 122 to a first eye 120, and second light engine 110 and second waveguide 118 are provided which present second display light 124 to second eye 126. However, a monocular display can be implemented by eliminating either set of the first light engine 108 and first waveguide 116, or the second light engine 110 and second waveguide 118.

Figure 2:
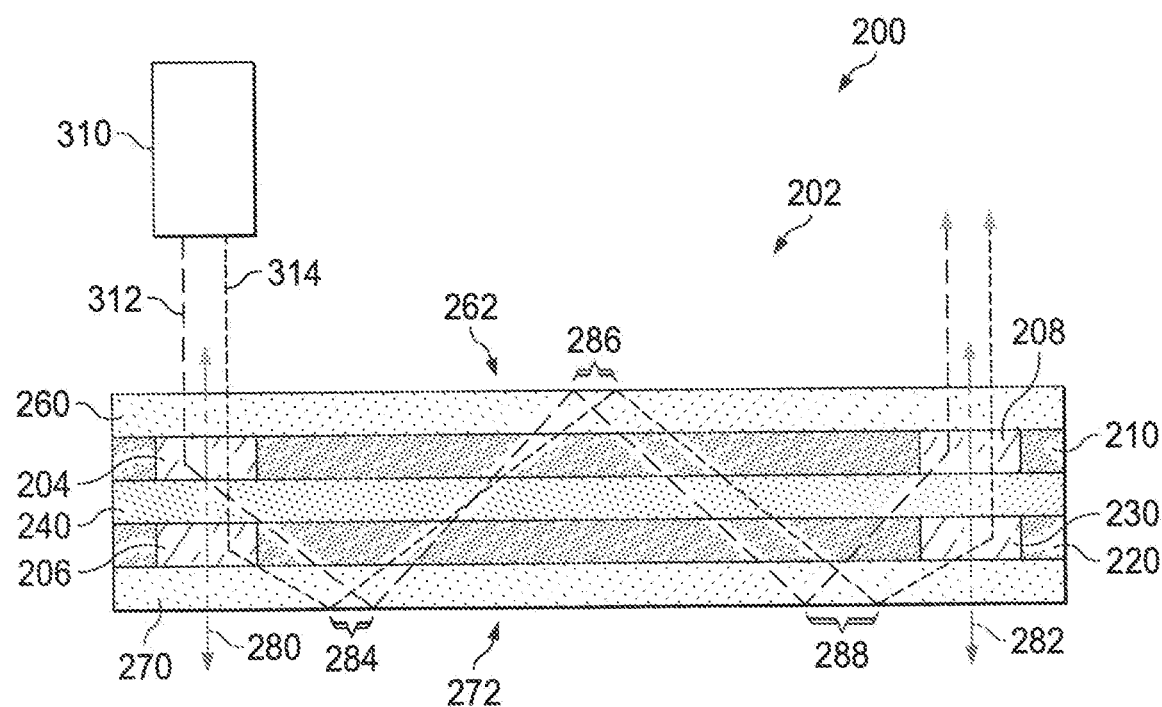
FIG. 2 is an orthogonal cross-section of a waveguide system having transmissive holographic incouplers and transmissive holographic outcouplers in accordance with some embodiments.

FIG. 2 illustrates an orthogonal cross-section of a holographic waveguide system 200 including transmissive holographic incouplers 204, 206 and transmissive holographic outcouplers 208, 230 within a waveguide 202. In the context of the holographic waveguides described herein, "incoupler" refers to an element that receives input light and redirects the input light to satisfy a total internal reflection condition of a waveguide. That is, the input light is redirected by the incoupler to be within a range of angles for which light will be reflected by boundaries of the waveguide, instead of passing through the boundaries. In the context of the holographic waveguides described herein, "outcoupler" refers to an element which receives light traveling within the waveguide and redirects the received light to not satisfy the total internal reflection condition of the waveguide. That is, the received light is redirected by the outcoupler to be outside of a range of angles for which light will be reflected by boundaries of the waveguide, such that the light will pass through the boundaries. In view of the above, an "incoupler" essentially redirects external light to travel within a waveguide, and an "outcoupler" essentially redirects light within a waveguide to leave the waveguide.

The waveguide 202 includes a first photopolymer layer 210, a second photopolymer layer 220, and a barrier layer 240 positioned between first photopolymer layer 210 and second photopolymer layer 220. Waveguide 202 also includes a first transparent layer 260 and a second transparent layer 270. The first photopolymer layer 210, second photopolymer layer 220, and barrier layer 240 are disposed between first transparent layer 260 and second transparent layer 270. Preferably, each of the first photopolymer layer 210, second photopolymer layer 220, barrier layer 240, the first transparent layer 260, and the second transparent layer 270 will have the same or similar index of refraction, to minimize undesired refraction of light traveling through waveguide 202. Thus, light which totally internally reflects within the volume of waveguide 202 will reflect off an outermost surface 262 of first transparent layer 260 or an outermost surface 272 of second transparent layer 270. Further, each of the first photopolymer layer 210, second photopolymer layer 220, barrier layer 240, the first transparent layer 260, and second transparent layer 270 can be planar or curved.

Additional layers can be included in waveguide 202, such as in the embodiment described below with reference to FIG. 5. The layers of waveguide 202 illustrated in FIG. 2 may be stacked atop one another such that the first photopolymer layer 210 is carried by the first transparent layer 260, the barrier layer 240 is carried by the first photopolymer layer 210, the second photopolymer layer 220 is carried by the barrier layer 240, and the second transparent layer 270 is carried by the second photopolymer layer 220.

The waveguide system 200 includes a light source 310 which outputs light 312 having a wavelength in a first waveband and light 314 having a wavelength in a second waveband different from the first waveband. For ease of illustration, separate wavebands of light 312 are illustrated as a single ray in the figures and corresponding operations described below. Preferably, the first waveband and the second waveband do not overlap. Incoupler 204 and outcoupler 208 can be responsive to light within the first waveband, and unresponsive to light outside the first waveband. Incoupler 206 and outcoupler 230 can be responsive to light within the second waveband, and unresponsive to light outside the second waveband.

Consequently, incoupler 204 can receive light 312, and redirect light 312 to travel within waveguide 202. Subsequently, outcoupler 208 can receive the light 312 traveling in the waveguide 202, and redirect the light 312 to exit waveguide 202. Similarly, incoupler 206 can receive light 314, and redirect light 314 to travel within the waveguide 202. Subsequently, outcoupler 230 can receive light 314 traveling in waveguide 202, and redirect light 314 to exit waveguide 202. Because incoupler 204 is unresponsive to light having a wavelength outside of the first waveband, light 314 can pass through incoupler 204 without being affected. This allows the waveguide to be designed around a select set of narrow waveband light sources, where each narrow waveband of light has a corresponding set of incoupling and outcoupling holograms in the waveguide.

Each of the incouplers shown in FIG. 2 can be laterally aligned with one another along a first axis 280 orthogonal to the photopolymer layers. For example, as illustrated in FIG. 2, first photopolymer layer 210 and second photopolymer layer 220 are parallel to each other, and the first incoupler 204 and the second incoupler 206 are aligned with each other along a first axis 280, which is orthogonal to first photopolymer layer 210 and second photopolymer layer 220. This allows light source 310 to output light 312 and light 314 to the same area of waveguide 202 such that light 312 and light 314 are both incident on first incoupler 204, but light 312 is refracted from first incoupler 204 while light 314 is transmitted unaltered through first incoupler 204 to second incoupler 206.

Similarly, each of the outcouplers shown in FIG. 2 can be laterally aligned with one another along a second axis 282 orthogonal to the photopolymer layers. As can be seen in FIG. 2, each of the first outcoupler 208 and the second outcoupler 230 are aligned with each other along a second axis 306, which is orthogonal to first photopolymer layer 210 and second photopolymer layer 220. This allows light 312 and light 314 traveling within waveguide 202 to be outcoupled over a display area. Although each of the incouplers can be generally aligned with each other as detailed above, each of the incouplers does not necessarily have to occupy an identical area within the different layers of waveguide 202. For example, the light source 310 may be positioned at an oblique angle relative to waveguide 202, such that each incoupler is positioned to occupy a slightly different area, even though the incouplers are generally aligned.

Each of the incouplers and outcouplers shown in FIG. 2 are transmissive holograms. In a transmissive hologram, light of a particular wavelength which is incident on a given incoupler or outcoupler configured to act on that wavelength passes through the incoupler or outcoupler but is refracted to travel at a different angle. However, it is also possible to record holograms in a layer of the waveguide 202 which are reflective, as discussed below with reference to FIG. 3.

In the following description of FIG. 2, a "first section" of an optical path refers to a path traveled by first light 312 or second light 314 from the point at which either light enters waveguide 202, to reflection area 284. The "second section" corresponds to the path then traveled by a representation of the light from reflection area 284 to reflection area 286. The "third section" refers to the path traveled by a representation of the light from reflection area 286 to reflection area 288. The "fourth section" corresponds to the path traveled by a representation of the light from reflection area 288 to the point at which the representation of the light exits waveguide 202. Details of the first through fourth sections of the optical path are described below. The reflection areas described herein do not have unique properties compared to the rest of the waveguide. Rather, the term "reflection area" is meant to delineate an area of the waveguide at which light is totally internally reflected at a boundary of the waveguide, and could conceivably be anywhere on a boundary of the waveguide, depending on the incidence angle of light entering the waveguide and redirection angle of a holographic incoupler. Note that once light from the light source 310 enters into the waveguide it is described as a "representation" of the light because properties of the light, such as, for example, the direction of polarization, may be changed as the light is transmitted through, and/or refracted, and/or reflected by the layers and surfaces of the waveguide 202.

The first holographic incoupler 204 and the first holographic outcoupler 208 of waveguide 202 define a first optical path for first light 312 having a wavelength in a first waveband which enters the waveguide 202. The first optical path includes a first section where first light 312 passes through first transparent layer 260, is redirected by first holographic incoupler 204, passes through the first barrier layer 240, passes through second photopolymer layer 220, enters second transparent layer 270, and is totally internally reflected by the outermost surface 272 of the second transparent layer 270 at reflection area 284. The first optical path includes a second section where the representation of the first light 312 that was reflected by the outermost surface of the second transparent layer 270 (at reflection area 284) exits second transparent layer 270, passes through second photopolymer layer 220, passes through first barrier layer 240, passes through first photopolymer layer 210, enters first transparent layer 260, and is totally internally reflected by outermost surface 262 of the first transparent layer 260 at reflection area 286. The first optical path includes a third section where the representation of the first light 312 reflected by the outermost surface 262 of first transparent layer 260 exits the first transparent layer 260, passes through first photopolymer layer 210, passes through first barrier layer 240, passes through second photopolymer layer 220, enters second transparent layer 270, and is totally internally reflected by the outermost surface 272 of the second transparent layer 270 at reflection area 288. The first optical path also includes a fourth section where the representation of the first light 312 reflected by the outermost surface 272 of second transparent layer 270 exits the second transparent layer 270, passes through second photopolymer layer 220, passes through first barrier layer 240, is redirected by first holographic outcoupler 208, and passes through first transparent layer 260, thereby exiting waveguide 202.

FIG. 2 also illustrates a second optical path for second light 314 having a wavelength in the second waveband which enters waveguide 202. The second optical path includes a first section where second light 314 passes through first transparent layer 260, passes through first photopolymer layer 210, passes through first barrier layer 240, is redirected by second holographic incoupler 206, enters second transparent layer 270, and is totally internally reflected by the outermost surface 272 of second transparent layer 270 at reflection area 284. The second optical path includes a second section where the representation of the second light 314 reflected by the outermost surface of second transparent layer 270 exits second transparent layer 270, passes through second photopolymer layer 220, passes through first barrier layer 240, passes through first photopolymer layer 210, enters first transparent layer 260, and is totally internally reflected by the outermost surface 262 of first transparent layer 260 at reflection area 286. The second optical path includes a third section where the representation of the second light 314 reflected by the outermost surface 262 of first transparent layer 260 exits first transparent layer 260, passes through first photopolymer layer 210, passes through first barrier layer 240, passes through second photopolymer layer 220, enters second transparent layer 270, and is totally internally reflected by the outermost surface 272 of second transparent layer 270. The second optical path also includes a fourth section in which the representation of the second light 314 reflected by the outermost surface of second transparent layer 270 exits second transparent layer 270, is redirected by second holographic outcoupler 230, passes through first barrier layer 240, passes through first photopolymer layer 210, and passes through first transparent layer 260, thereby exiting waveguide 202.

Figure 3:
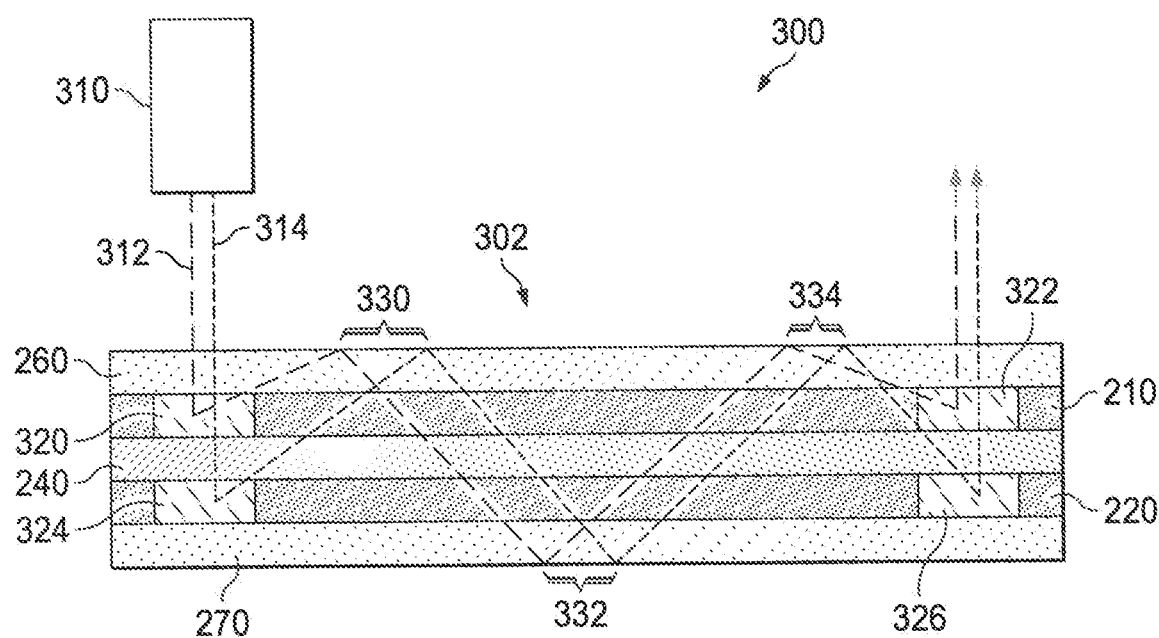
FIG. 3 is an orthogonal cross-section of the holographic waveguide system of FIG. 2 having reflective holographic incouplers and reflective holographic outcouplers in accordance with some embodiments.

FIG. 3 is an orthogonal cross-section of a waveguide system 300 including a light source 310 and a waveguide 302 having similar layers discussed above with reference to FIG. 2. Waveguide 302 includes a first holographic incoupler 320 recorded in first photopolymer layer 210, and a first holographic outcoupler 322 recorded in first photopolymer layer 210. Waveguide 302 also includes a second holographic incoupler 324 recorded in second photopolymer layer 220, and a second holographic outcoupler 326 recorded in second photopolymer layer 220. In contrast to the transmissive hologram incouplers 204 and 206 illustrated in FIG. 2, each of the incouplers and outcouplers illustrated in FIG. 3 are reflective holograms. That is, light which is incident on a given incoupler or outcoupler illustrated in FIG. 3 is reflected from the respective incoupler or outcoupler, to travel generally back in the direction from which the light originated but at a different angle. The use of reflective holograms for incouplers and outcouplers results in optical paths for light traveling within the waveguide 302 as discussed below.

The waveguide system 300 includes a light source 310, which outputs first light 312 having a wavelength in a first waveband, and second light 314 having a wavelength in a second waveband different from the first waveband. Preferably, the first waveband and the second waveband do not overlap. Incoupler 320 and outcoupler 322 are responsive to light within the first waveband and unresponsive to light outside the first waveband. Incoupler 324 and outcoupler 326 are responsive to light within the second waveband and unresponsive to light outside the second waveband.

Consequently, incoupler 320 receives light 312, and redirects light 312 to travel within the waveguide 302. Subsequently, outcoupler 322 receives light 312 traveling in the waveguide 302 and redirects light 312 to exit waveguide 302. Similarly, incoupler 324 receives light 314, and redirects light 314 to travel within the waveguide 302. Subsequently, outcoupler 326 receives the light 314 traveling in the waveguide 302 and redirects light 314 to exit waveguide 302. Because incoupler 320 is unresponsive to light having a wavelength outside of the first waveband, light 314 passes through incoupler 320 without being affected. This allows the waveguide 302 to be designed around a select set of narrow waveband light sources, where each narrow waveband of light has a corresponding set of incoupling and outcoupling holograms in the waveguide 302.

In the description of FIG. 3 that follows, the "first section" corresponds to the path traveled by either first light 312 or second light 314 from the point at which light 312, 314 enters waveguide 302 to reflection area 330. The "second section" corresponds to the path traveled by the representation of the first or second light 312, 314 from reflection area 330 to reflection area 332. The "third section" corresponds to the path traveled by the representation of the first or second light 312, 314 from reflection area 332 to reflection area 334. The "fourth section" corresponds to the path traveled by the representation of the first or second light 312, 314 from reflection area 334 to the point at which the representation of first or second light 312, 314 exits waveguide 302.

The first holographic incoupler 320 and the first holographic outcoupler 322 define a first optical path for first light 312 having a wavelength in the first waveband which enters the waveguide 302. The first optical path includes a first section where first light 312 passes through first transparent layer 260, is reflected by first holographic incoupler 320 back into first transparent layer 260, and is totally internally reflected by an outermost surface 262 of the first transparent layer 260 at reflection area 330. The first optical path includes a second section where the representation of first light 312 reflected by the outermost surface 262 of the first transparent layer 260 at reflection area 330 exits first transparent layer 260, passes through first photopolymer layer 210, passes through first barrier layer 240, passes through second photopolymer layer 220, enters second transparent layer 270, and is totally internally reflected by an outermost surface 272 of the second transparent layer 270 at reflection area 332. The first optical path includes a third section where the representation of first light 312 reflected by the outermost surface 272 of the second transparent layer 270 at reflection area 332 exits second transparent layer 270, passes through second photopolymer layer 220, passes through first barrier layer 240, passes through first photopolymer layer 210, enters first transparent layer 260, and is totally internally reflected by the outermost surface 262 of first transparent layer 260 at reflection area 334. The first optical path also includes a fourth section where the representation of first light 312 reflected by the outermost surface 262 of first transparent layer 260 exits first transparent layer 260, is reflected by first holographic outcoupler 322 back into first transparent layer 260, and passes through first transparent layer 260, thereby exiting waveguide 302.

FIG. 3 also illustrates a second optical path for second light 314 having a wavelength in the second waveband which enters waveguide 302. The second optical path includes a first section where second light 314 passes through first transparent layer 260, passes through first photopolymer layer 210, passes through first barrier layer 240, is reflected by second holographic incoupler 322 back into first barrier layer 240, passes through first barrier layer 240, passes through first photopolymer layer 210, enters first transparent layer 260, and is totally internally reflected by an outermost surface 262 of first transparent layer 260 at reflection area 330. The second optical path includes a second section where the representation of the second light 314 reflected by the outermost surface 262 of first transparent layer 260 at reflection area 330, exits first transparent layer 260, passes through first photopolymer layer 210, passes through first barrier layer 240, passes through second photopolymer layer 220, enters second transparent layer 270, and is totally internally reflected by the outermost surface 272 of second transparent layer 270 at reflection area 332. The second optical path includes a third section where the representation of second light 314 reflected by the outermost surface 272 of second transparent layer 270 exits second transparent layer 270, passes through second photopolymer layer 220, passes through first barrier layer 240, passes through first photopolymer layer 210, enters first transparent layer 260, and is totally internally reflected by the outermost surface 262 of first transparent layer 260 at reflection area 334. The second optical path includes a fourth section where the representation of second light 314 reflected by the outermost surface of first transparent layer 260 exits first transparent layer 260, passes through first photopolymer layer 210, passes through first barrier layer 240, is reflected by second holographic outcoupler 326 back into first barrier layer 240, passes through first barrier layer 240, passes through first photopolymer layer 210, and passes through first transparent layer 260, thereby exiting waveguide 302.

Each of incoupler 320 and incoupler 324 can be laterally aligned with each other, such as being aligned along a first axis perpendicular to the first photopolymer layer 210 and second photopolymer layer 220. Further, each of outcoupler 322 and outcoupler 326 can be laterally aligned with each other, such as being aligned along a second axis perpendicular to the first photopolymer layer 210 and second photopolymer layer 220.

FIGS. 2 and 3 each show first light 312 and second light 314 each totally internally reflecting three times within waveguide 202 or waveguide 302. This number of reflections is merely exemplary and may be smaller or larger. For example, light coupled into waveguide 202 or waveguide 302 may only be totally internally reflected a single time, twice, five times, ten times, twenty times, or more, as appropriate for a given application.

FIGS. 2 and 3 also each illustrate light source 310 as outputting first light 312 having a wavelength in a first waveband, and second light 314 having a wavelength in a second waveband different from the first waveband. However, it is possible for a light source to emit light in more wavebands, and for a waveguide to be able to direct such light in other wavebands.

Figure 4:
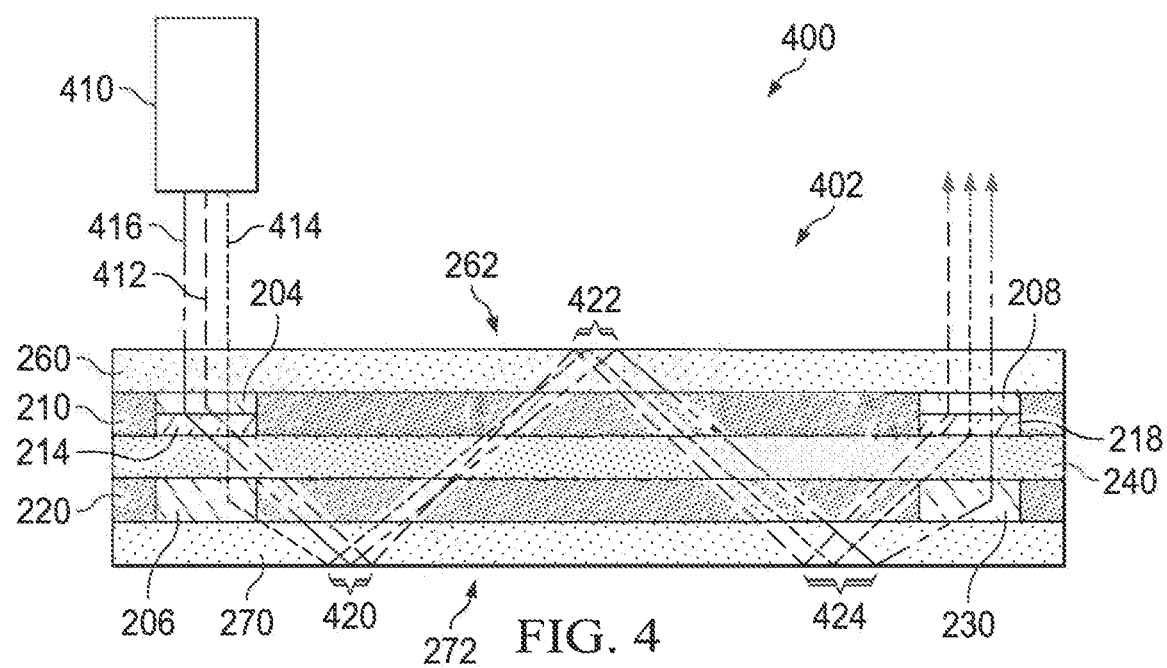
FIG. 4 is an orthogonal side view of the holographic waveguide system of FIG. 2 having multiple holographic incouplers and holographic outcouplers in the same photopolymer layer in accordance with some embodiments.

FIG. 4 an orthogonal cross-section of a waveguide system 400 including a waveguide 402 having similar layers discussed above with reference to FIG. 2 and having multiple incouplers and outcouplers in the same photopolymer layer. The waveguide system 400 includes a light source 410 which outputs first light 412 having a wavelength in a first waveband, second light 414 having a wavelength in a second waveband, and third light 416 having a wavelength in a third waveband. The first waveband, the second waveband, and the third waveband are different from each other, and preferably do not overlap with each other.

The first photopolymer layer 210 includes first holographic incoupler 204, which redirects first light 412 into the waveguide 402, and first holographic outcoupler 208. The second photopolymer layer 220 includes second holographic incoupler 206, which redirects second light 414 into waveguide 402, and second holographic outcoupler 230. In addition, first photopolymer layer 210 in waveguide 402 includes a third holographic incoupler 214, which redirects third light 416 into waveguide 402, and a third holographic outcoupler 218.

In the following description of the third optical path illustrated in FIG. 4, the "first section" corresponds to the path traveled by third light 416 from the point at which third light 416 enters waveguide 402, to reflection area 420. The "second section" corresponds to the path traveled by the representation of third light 416 from reflection area 420 to reflection area 422. The "third section" corresponds to the path traveled by the representation of third light 416 from reflection area 422 to reflection area 424. The "fourth section" corresponds to the path traveled by the representation of third light 416 from reflection area 424 to the point at which the representation of third light 416 exits waveguide 402.

The third holographic incoupler 214 and the third holographic outcoupler 218 define the third optical path for third light 416 having a wavelength in the third waveband which enters waveguide 402. The third optical path includes a first section where third light 416 passes through first transparent layer 260, is redirected by third holographic incoupler 214, passes through first barrier layer 240, passes through second photopolymer layer 220, enters second transparent layer 270, and is totally internally reflected by the outermost surface 272 of second transparent layer 270 at reflection area 420. The third optical path includes a second section where the representation of third light 416 reflected by the outermost surface 272 of second transparent layer 270 exits second transparent layer 270, passes through second photopolymer layer 220, passes through first barrier layer 240, passes through first photopolymer layer 210, enters first transparent layer 260, and is totally internally reflected by the outermost surface 262 of first transparent layer 260 at reflection area 422. The third optical path includes a third section where the representation of third light 416 reflected by the outermost surface 262 of first transparent layer 260 exits first transparent layer 260, passes through first photopolymer layer 210, passes through first barrier layer 240, passes through second photopolymer layer 220, enters second transparent layer 270, and is totally internally reflected by an outermost surface 272 of second transparent layer 270 at reflection area 424. The third optical path also includes a fourth section where the representation of third light 416 reflected by the outermost surface 272 of second transparent layer 270 exits second transparent layer 270, passes through second photopolymer layer 220, passes through first barrier layer 240, is redirected by third holographic outcoupler 218, and passes through first transparent layer 260, thereby exiting waveguide 402.

FIG. 4 shows each of the holographic incouplers and holographic outcouplers as being transmissive holograms. However, any of the holographic incouplers and outcouplers could be reflective holograms, such as those described with reference to FIG. 2 above. In particular, first holographic incoupler 204 and first holographic outcoupler 208 can be reflective holograms which redirect first light 412 through waveguide 402 similar to how first holographic incoupler 320 and first holographic outcoupler 322 redirect first light 312 through waveguide 302, such as according to the first optical path illustrated in FIG. 3 and described above. Second holographic incoupler 206 and second holographic outcoupler 230 could be reflective holograms which redirect second light 414 through waveguide 402, similar to how second holographic incoupler 324 and second holographic outcoupler 326 redirect second light 314 through waveguide 302, such as according to the second optical path illustrated in FIG. 3 and described above.

Additionally, third holographic incoupler 214 and third holographic outcoupler 218 could be reflective holograms which define an alternative third optical path for third light 416 having a wavelength in the third waveband which enters waveguide 402. The alternative third optical path can include a first section where the third light 416 passes through first transparent layer 260, is reflected by third holographic incoupler 214 back into first transparent layer 260, and is totally internally reflected by an outermost surface of first transparent layer 260. The alternative third optical path can include a second section where the representation of third light 416 reflected by the outermost surface of first transparent layer 260 exits first transparent layer 260, passes through first photopolymer layer 210, passes through first barrier layer 240, passes through second photopolymer layer 220, enters second transparent layer 270, and is totally internally reflected by an outermost surface 272 of second transparent layer 270. The alternative third optical path can include a third section where the representation of third light 416 reflected by the outermost surface 272 of the second transparent layer 270 exits second transparent layer 270, passes through second photopolymer layer 220, passes through first barrier layer 240, passes through first photopolymer layer 210, enters first transparent layer 260, and is totally internally reflected by the outermost surface 262 of first transparent layer 260. The alternative third optical path can include a fourth section where the representation of third light 416 reflected by the outermost surface 262 of first transparent layer 260 exits first transparent layer 260, is reflected by third holographic outcoupler 218 back into first transparent layer 260, and passes through first transparent layer 260, thereby exiting waveguide 402.

FIG. 4 illustrates the first, second, and third light 412, 414, and 416 each totally internally reflecting three times within waveguide 402. This number of reflections is merely exemplary and may be smaller or larger. For example, light coupled into waveguide 402 may be totally internally reflected a single time, five times, ten times, twenty times, or more, as appropriate for a given application.

The first incoupler 212 is depicted in FIG. 4 as being spatially offset from third incoupler 214 in first photopolymer layer 210. However, in practice first incoupler 212 and third incoupler 214 could be recorded to occupy a similar volume in the photopolymer layer 210. Similarly, first outcoupler 216 is depicted in FIG. 4 as being spatially offset from third outcoupler 218 in first photopolymer layer 210. However, in practice first outcoupler 216 and third outcoupler 218 could be recorded to occupy a similar volume in first photopolymer layer 210.

The first photopolymer layer 210 of waveguide 402 includes two holographic incouplers and two holographic outcouplers recorded in the first photopolymer layer 210. Similar features could be achieved in second photopolymer layer 220, such that second photopolymer layer 220 includes two holographic incouplers responsive to different respective wavebands, and two outcouplers responsive to said different respective wavebands. In an exemplary implementation, the first photopolymer layer 210 could include a single holographic incoupler and a single holographic outcoupler, whereas second photopolymer layer 220 could include two holographic incouplers and two holographic outcouplers. In another exemplary implementation, first photopolymer layer 210 could include two or more holographic incouplers, and two or more holographic outcouplers, and second photopolymer layer 220 could include two or more holographic incouplers and two or more holographic outcouplers.

As discussed with reference to FIGS. 2 and 3 above, each of incoupler 204, incoupler 214, and incoupler 222 can be laterally aligned with each other, such as being aligned along a first axis perpendicular to first photopolymer layer 210 and second photopolymer layer 220. Further, each of outcoupler 208, outcoupler 218, and outcoupler 230 can be laterally aligned with each other, such as being aligned along a second axis perpendicular to first photopolymer layer 210 and second photopolymer layer 220.

Figure 5:
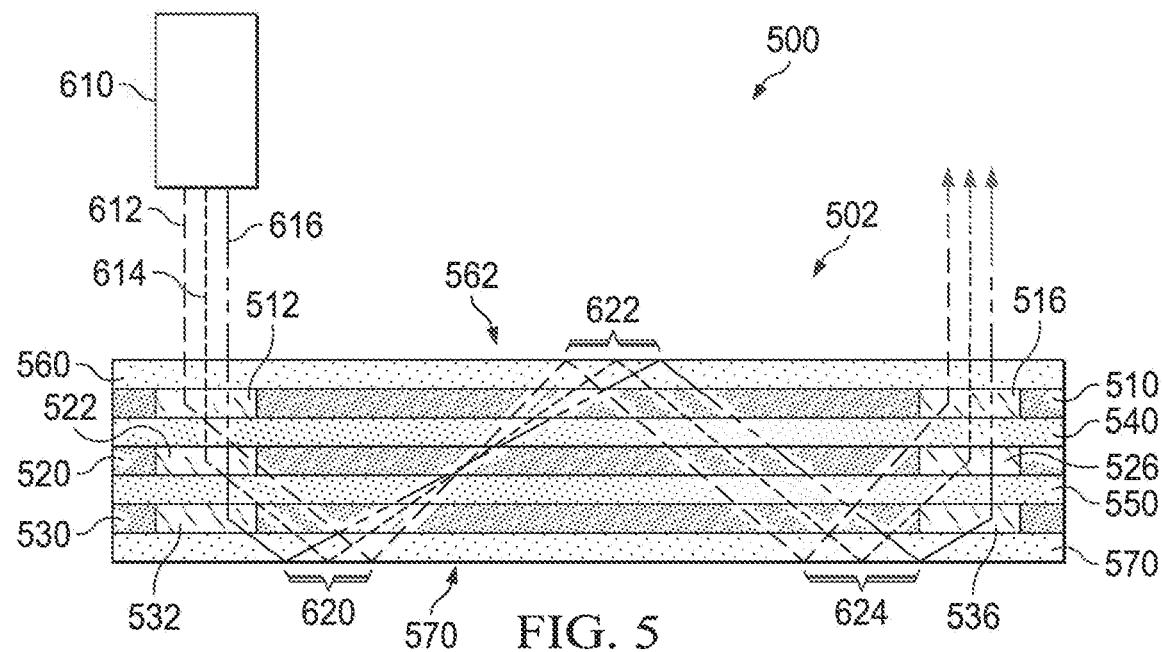
FIG. 5 is an orthogonal cross-section of another holographic waveguide system having holographic incouplers and holographic outcouplers in accordance with some embodiments.

FIG. 5 illustrates an orthogonal side view of another waveguide system 500. While waveguide system 500 of FIG. 5 is similar to waveguide system 200 of FIG. 2, waveguide 502 includes additional layers. Waveguide 502 includes a first photopolymer layer 510, a second photopolymer layer 520, a third photopolymer layer 530, a first barrier layer 540 disposed between first photopolymer layer 510 and second photopolymer layer 520, and a second barrier layer 550 disposed between second photopolymer layer 520 and third photopolymer layer 530. Waveguide 502 also includes a first transparent layer 560 and a second transparent layer 570. First photopolymer layer 510, second photopolymer layer 520, third photopolymer layer 530, barrier layer 54, and barrier layer 550 are disposed between first transparent layer 560 and second transparent layer 570. Preferably, each of first photopolymer layer 510, second photopolymer layer 520, third photopolymer layer 530, first barrier layer 540, second barrier layer 550, first transparent layer 560, and second transparent layer 570 will have a same or similar index of refraction to minimize undesired refraction of light traveling through waveguide 502 when said light crosses between layers. Further, each of first photopolymer layer 510, second photopolymer layer 520, third photopolymer layer 530, first barrier layer 540, second barrier layer 550, first transparent layer 560, and second transparent layer 570 can be planar or curved.

The waveguide 502 includes a first holographic incoupler 512 recorded in first photopolymer layer 510, and a first holographic outcoupler 516 recorded in first photopolymer layer 510. The waveguide also includes a second holographic incoupler 522 recorded in second photopolymer layer 520, a second holographic outcoupler 526 recorded in second photopolymer layer 520, a third holographic incoupler 532 recorded in third photopolymer layer 530, and a third holographic outcoupler 536 recorded in third photopolymer layer 530.

The waveguide system 500 further includes a light source 610, which outputs first light 612 having a wavelength in a first waveband, second light 614 having a wavelength in a second waveband, and third light 616 having a wavelength in a third waveband. The first waveband, second waveband, and third waveband are different from each other, and preferably do not overlap. The first holographic incoupler 512 and first holographic outcoupler 516 are responsive to light within the first waveband and unresponsive to light outside the first waveband. The second holographic incoupler 522 and second holographic outcoupler 526 are responsive to light within the second waveband and unresponsive to light outside the second waveband. The third holographic incoupler 532 and third holographic outcoupler 536 are responsive to light within the third waveband and unresponsive to light outside the third waveband. Consequently, first holographic incoupler 512 receives first light 612, and redirects first light 612 to travel within waveguide 502. Subsequently, first holographic outcoupler 516 receives the representation of first light 612 traveling in waveguide 502 and redirects the representation of first light 612 to exit waveguide 502. Similarly, second holographic incoupler 522 receives second light 614, and redirects second light 614 to travel within waveguide 502. Subsequently, second holographic outcoupler 526 receives second light 614 traveling in waveguide 502 and redirects the representation of second light 614 to exit waveguide 502. Because first holographic incoupler 512 is unresponsive to light having a wavelength outside of the first waveband, second light 614 passes through first holographic incoupler 512 without being affected. Similarly, third holographic incoupler 532 receives third light 616, and redirects third light 616 to travel within waveguide 502. Subsequently, third holographic outcoupler 536 receives the representation of third light 616 traveling in waveguide 502 and redirects the representation of third light 616 to exit waveguide 502. Because first holographic incoupler 512 is unresponsive to light having a wavelength outside of the first waveband, and second holographic incoupler 522 is unresponsive to light having a wavelength outside of the second waveband, third light 616 can pass through first holographic incoupler 512 and second holographic incoupler 522 without being affected. This allows the waveguide to be designed around a select set of narrow waveband light sources, where each narrow waveband of light is directed by a corresponding set of incoupling and outcoupling holograms in the waveguide.

In the following description of the optical paths illustrated in FIG. 5, the "first section" corresponds to the path traveled by the first, second, or third light 612, 614, 616 from the point at which light 612, 614, 616 enters waveguide 502 to reflection area 620. The "second section" corresponds to the path traveled by light 612, 614, 616 from reflection area 620 to reflection area 622. The "third section" corresponds to the path traveled by light 612, 614, 616 from reflection area 622 to reflection area 624 and the "fourth section" corresponds to the path traveled by light 612, 614, 616 from reflection area 624 to the point at which the light 612, 614, 616 exits waveguide 502.

The first holographic incoupler 512 and the first holographic outcoupler 516 define a first optical path for first light 612 having a wavelength in the first waveband which enters waveguide 502. The first optical path includes a first section where first light 612 passes through first transparent layer 560, is redirected by first holographic incoupler 512, passes through first barrier layer 540, passes through second photopolymer layer 520, passes through second barrier layer 550, passes through third photopolymer layer 530, enters second transparent layer 570, and is totally internally reflected by an outermost surface 572 of second transparent layer 570 at reflection area 620. The first optical path includes a second section where the representation of first light 612 reflected by the outermost surface 572 of second transparent layer 570 exits second transparent layer 570, passes through third photopolymer layer 530, passes through second barrier layer 550, passes through second photopolymer layer 520, passes through first barrier layer 540, passes through first photopolymer layer 510, enters first transparent layer 560, and is totally internally reflected by an outermost surface 562 of first transparent layer 560 at reflection area 622. The first optical path includes a third section where the representation of first light 612 reflected by the outermost surface 562 of first transparent layer 560 exits first transparent layer 560, passes through first photopolymer layer 510, passes through first barrier layer 540, passes through second photopolymer layer 520, passes through second barrier layer 550, passes through third photopolymer layer 530, enters second transparent layer 570, and is totally internally reflected by the outermost surface 572 of second transparent layer 570 at reflection area 624. The first optical path includes a fourth section where the representation of first light 612 reflected by the outermost surface 572 of second transparent layer 570 exits second transparent layer 570, passes through third photopolymer layer 530, passes through second barrier layer 550, passes through second photopolymer layer 520, passes through first barrier layer 540, is redirected by first holographic outcoupler 516, and passes through first transparent layer 560, thereby exiting the holographic waveguide 502.

FIG. 5 also illustrates a second optical path for second light 614 having a wavelength in the second waveband which enters waveguide 502. The second optical path includes a first section where second light 614 passes through first transparent layer 560, passes through first photopolymer layer 510, passes through first barrier layer 540, is redirected by the second holographic incoupler 522, passes through second barrier layer 550, passes through third photopolymer layer 530, enters second transparent layer 570, and is totally internally reflected by the outermost surface 572 of second transparent layer 570 at reflection area 620. The second optical path includes a second section where the representation of second light 614 reflected by the outermost surface 572 of second transparent layer 570 exits second transparent layer 570, passes through third photopolymer layer 530, passes through second barrier layer 550, passes through second photopolymer layer 520, passes through first barrier layer 540, passes through first photopolymer layer 510, enters first transparent layer 560, and is totally internally reflected by an outermost surface 562 of the first transparent layer 560 at reflection area 622. The second optical path includes a third section where the representation of second light 614 reflected by the outermost surface 562 of first transparent layer 560 exits first transparent layer 560, passes through first photopolymer layer 510, passes through first barrier layer 540, passes through second photopolymer layer 520, passes through second barrier layer 550, passes through third photopolymer layer 530, enters second transparent layer 570, and is totally internally reflected by the outermost surface 572 of second transparent layer 570 at reflection area 624. The second optical path includes a third section where the representation of second light 614 reflected by the outermost surface 572 of second transparent layer 570 exits second transparent layer 570, passes through third photopolymer layer 530, passes through second barrier layer 550, is redirected by second holographic outcoupler 526, passes through first barrier layer 540, passes through first photopolymer layer 510, and passes through first transparent layer 560, thereby exiting waveguide 502.

The third holographic incoupler 532 and the third holographic outcoupler 536 of waveguide 502 can also define a third optical path for third light 616 having a wavelength in the third waveband which enters waveguide 502. The third optical path includes a first section where third light 616 passes through first transparent layer 560, passes through first photopolymer layer 510, passes through first barrier layer 540, passes through second photopolymer layer 520, passes through second barrier layer 550, is redirected by third holographic incoupler 532, enters second transparent layer 570, and is totally internally reflected by the outermost surface 572 of second transparent layer 570 at reflection area 620. The third optical path includes a second section where third light 616 reflected by the outermost surface 572 of second transparent layer exits second transparent layer 570, passes through third photopolymer layer 530, passes through second barrier layer 550, passes through second photopolymer layer 520, passes through first barrier layer 540, passes through first photopolymer layer 510, enters first transparent layer 560, and is totally internally reflected by the outermost surface 562 of first transparent layer 560 at reflection area 622. The third optical path includes a third section where the representation of third light 616 reflected by the outermost surface of first transparent layer 560 exits first transparent layer 560, passes through first photopolymer layer 510, passes through first barrier layer 540, passes through second photopolymer layer 520, passes through second barrier layer 550, passes through third photopolymer layer 530, enters second transparent layer 570, and is totally internally reflected by the outermost surface 572 of second transparent layer 570 at reflection area 624. The third optical path also includes a fourth section where the representation of third light 616 reflected by the outermost surface 572 of second transparent layer 570 exits second transparent layer 570, is redirected by third holographic outcoupler 536, passes through second barrier layer 550, passes through second photopolymer layer 520, passes through first barrier layer 540, passes through first photopolymer layer 510, and passes through first transparent layer 560, thereby exiting waveguide 502.

Each holographic incoupler and holographic outcoupler illustrated in FIG. 5 is a transmissive hologram. However, any of the holographic incouplers and holographic outcouplers could be reflective holograms, such as those illustrated in FIG. 3. An exemplary first optical path is described below for first light 612 in a case where first holographic incoupler 512 and first holographic outcoupler 516 are reflective holograms. An exemplary second optical path is discussed below for second light 614 in a case where second holographic incoupler 522 and second holographic outcoupler 526 are reflective holograms. An exemplary third optical path is discussed below for third light 616 in a case where third holographic incoupler 532 and third holographic outcoupler 536 are reflective holograms.

The reflective first holographic incoupler 512 and reflective first holographic outcoupler 516 can define a first optical path for first light 612 having a wavelength in the first waveband which enters waveguide 502. The first optical path can include a first section where first light 612 passes through first transparent layer 560, is reflected by first holographic incoupler 512 back into first transparent layer 560, and is totally internally reflected by an outermost surface 562 of the first transparent layer 560. The first optical path can include a second section where the representation of first light 612 reflected by the outermost surface 562 of first transparent layer 560 exits first transparent layer 560, passes through first photopolymer layer 510, passes through first barrier layer 540, passes through second photopolymer layer 520, passes through second barrier layer 550, passes through third photopolymer layer 530, enters second transparent layer 570, and is totally internally reflected by the outermost surface 572 of second transparent layer 570. The first optical path can include a third section where the representation of first light 612 reflected by the outermost surface 572 of second transparent layer 570 exits second transparent layer 570, passes through third photopolymer layer 530, passes through second barrier layer 550, passes through second photopolymer layer 520, passes through first barrier layer 540, passes through first photopolymer layer 510, enters first transparent layer 560, and is totally internally reflected by the outermost surface of first transparent layer 560. The first optical path can include a fourth section where the representation of first light 612 reflected by the outermost surface 562 of first transparent layer 560 exits first transparent layer 560, is reflected by first holographic outcoupler 516 back into first transparent layer 560, and passes through first transparent layer 560, thereby exiting waveguide 502.

The reflective second holographic incoupler 522 and the reflective second holographic outcoupler 526 can define a second optical path for second light 614 having a wavelength in the second waveband which enters waveguide 502. The second optical path can include a first section where second light 614 passes through first transparent layer 560, passes through first photopolymer layer 510, passes through first barrier layer 540, is reflected by second holographic incoupler 522 back into first barrier layer 540, passes through first barrier layer 540, passes through first photopolymer layer 510, enters first transparent layer 560, and is totally internally reflected by the outermost surface 562 of first transparent layer 560. The second optical path can include a second section where the representation of second light 614 reflected by the outermost surface 562 of first transparent layer 560 exits first transparent layer 560, passes through first photopolymer layer 510, passes through first barrier layer 540, passes through second photopolymer layer 520, passes through second barrier layer 550, passes through third photopolymer layer 530, enters second transparent layer 570, and is totally internally reflected by the outermost surface 572 of second transparent layer 570. The second optical path can include a third section where the representation of second light 614 reflected by the outermost surface 572 of second transparent layer 570 exits second transparent layer 570, passes through third photopolymer layer 530, passes through second barrier layer 550, passes through second photopolymer layer 520, passes through first barrier layer 540, passes through first photopolymer layer 510, enters first transparent layer 560, and is totally internally reflected by outermost surface 562 of first transparent layer 560. The second optical path can include a fourth section where the representation of second light 614 reflected by the outermost surface 562 of first transparent layer 560 exits first transparent layer 560, passes through first photopolymer layer 510, passes through first barrier layer 540, is reflected by second holographic outcoupler 526 back into first barrier layer 540, passes through first barrier layer 540, passes through first photopolymer layer 510, and passes through first transparent layer 560, thereby exiting waveguide 502.

The reflective third holographic incoupler 532 and reflective third holographic outcoupler 536 can define a third optical path for third light 616 having a wavelength in the third waveband which enters waveguide 502. The third optical path can include a first section where third light 616 passes through first transparent layer 660, passes through first photopolymer layer 510, passes through first barrier layer 540, passes through second photopolymer layer 520, passes through second barrier layer 550, is reflected by third holographic incoupler 532 back into second barrier layer 550, passes through second barrier layer 550, passes through second photopolymer layer 520, passes through first barrier layer 540, passes through first photopolymer layer 510, enters first transparent layer 560, and is totally internally reflected by the outermost surface 562 of first transparent layer 560. The third optical path can include a second section where third light 616 reflected by the outermost surface of first transparent layer 660 exits first transparent layer 660, passes through first photopolymer layer 510, passes through first barrier layer 540, passes through second photopolymer layer 520, passes through second barrier layer 550, passes through third photopolymer layer 530, enters second transparent layer 570, and is totally internally reflected by the outermost surface 572 of second transparent layer 570. The third optical path can include a third section where third light 616 reflected by the outermost surface of second transparent layer 570 exits second transparent layer 570, passes through third photopolymer layer 530, passes through second barrier layer 550, passes through second photopolymer layer 520, passes through first barrier layer 540, passes through first photopolymer layer 510, enters first transparent layer 560, and is totally internally reflected by the outermost surface 562 of the first transparent layer 560. The third optical path can include a fourth section where third light 616 reflected by the outermost surface 562 of first transparent layer 560 exits first transparent layer 560, passes through first photopolymer layer 510, passes through first barrier layer 540, passes through second photopolymer layer 520, passes through second barrier layer 550, is reflected by third holographic outcoupler 536 back into second barrier layer 550, passes through second barrier layer 550, passes through second photopolymer layer 520, passes through first barrier layer 540, passes through first photopolymer layer 510, and passes through first transparent layer 560, thereby exiting waveguide 502.

Further, FIG. 5 shows first light 612, second light 614, and third light 616 each totally internally reflecting three times within waveguide 502. This number of reflections is merely exemplary and may be smaller or larger. For example, light coupled into waveguide 502 may only be totally internally reflected a single time, five times, ten times, twenty times, or more, as appropriate for a given application.

In the implementation illustrated in FIG. 5, a respective photopolymer layer is provided which includes a holographic incoupler and a holographic outcoupler for each waveband of light provided by a light source. In such an implementation, the chemistry of each photopolymer layer can be selected in order to optimize performance, efficiency, and responsiveness to the desired waveband of light which will be directed by a respective photopolymer layer.

Each of incoupler 512, incoupler 522, and incoupler 532 can be laterally aligned with each other, such as being aligned along a first axis perpendicular to first photopolymer layer 510, second photopolymer layer 520, and third photopolymer layer 530. Further, each of outcoupler 216, outcoupler 226, and outcoupler 236 can be laterally aligned with each other, such as being aligned along a second axis perpendicular to first photopolymer layer 510, second photopolymer layer 520, and third photopolymer layer 530.

Whether the holographic incouplers and holographic outcouplers are reflective holograms or transmissive holograms, each of FIGS. 2, 3, 4, and 5 illustrate holographic incouplers receiving input light from a light source and redirecting the input light to totally internally reflect from the outside boundaries of the transparent layers which surround the holographic elements of the waveguide. Notably, total internal reflection within the waveguide herein can encompass total internal reflection at boundaries of transparent layers which envelope holographic elements, total internal reflection at the holographic elements themselves is not required. To achieve this, each of the transparent layers, the photopolymer layers, and the barrier layers can have a same index of refraction.

Figure 6:
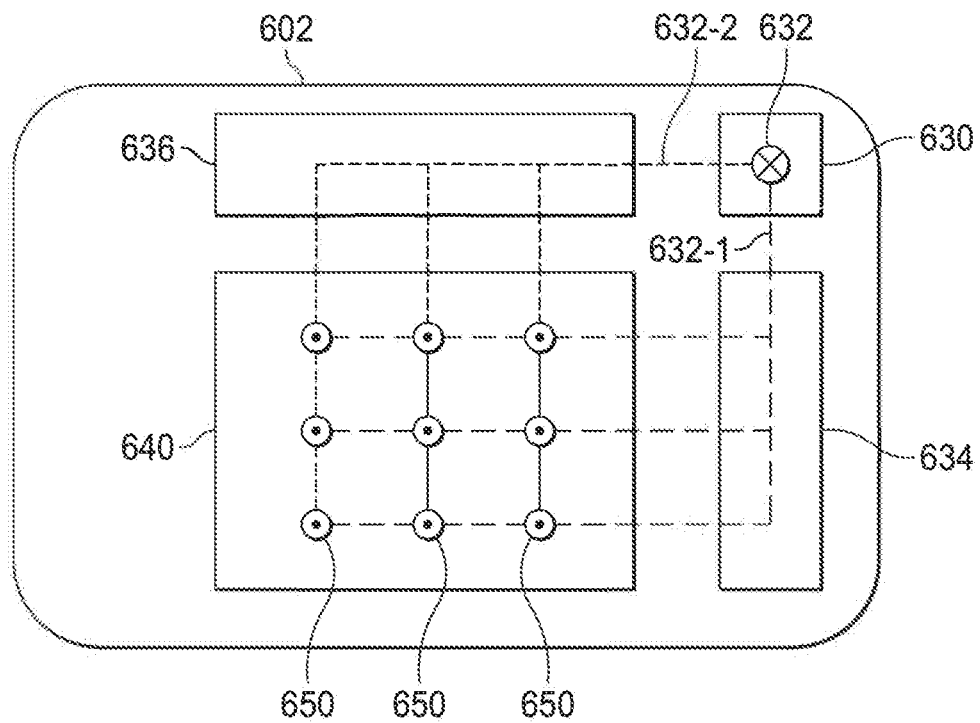
FIG. 6 is an orthogonal front view illustrating a waveguide implementing expander areas containing multiple incouplers and outcouplers in accordance with some embodiments.

FIG. 6 is an orthogonal front view that illustrates an exemplary waveguide 602 implementing expanders to achieve eye box expansion by exit pupil duplication. Waveguide 602 includes an incoupler area 630, which receives input light 632 from a light source such as a scanning laser projector. Incoupler area 630 redirects input light 632 to travel within waveguide 602 in at least one direction. Incoupler area 630 includes a plurality of holographic incouplers aligned atop one another, such as holographic incouplers 204, 206, 212, 214, 222, 320, 324, 512, 522, or 532 described above. In the example of FIG. 6, a first set of at least one holographic incouplers redirects a first subset 632-1 of input light 632 to travel towards a first expander area 634. A second set of holographic incouplers redirects a second subset 632-2 of input light 632 to travel towards a second expander area 636. As an example, input light 632 could include a red component, a green component, and a blue component. Incoupler area 630 could include a holographic incoupler responsive only to red light, which redirects the red component of input light 632 towards first expander area 634. Incoupler area 630 could also include a holographic incoupler responsive only to green light, which redirects the green component of input light 632 toward second expander area 636. Incoupler area 630 could also include a holographic incoupler responsive to only blue light which redirects the blue component of input light 632 towards second expander area 636. In this example, the first subset 632-1 of input light 632 includes the red component of input light 632, whereas the second subset 632-2 of input light 632 includes the green component and the blue component of input light 632.

Expander area 634 and expander area 636 serve to form duplicates of input light 632, for the purpose of exit pupil duplication. In the example of FIG. 6, light 632-1 travels through waveguide 602 by total internal reflection to expander area 634. Expander area 634 includes a redirector area, such as a surface relief grating or holographic grating, which, when impinged upon by light 632-1, redirects light 632-1 towards outcoupler area 640. Further, expander area 634 is configured such that less than 100% of light impingent thereon will be redirected. In this way, light 632-1 can continue to travel through waveguide 602 by totally internally reflecting at the surface boundaries of waveguide 602, wherein each time light 632-1 impinges on expander area 634, a portion of light 632-1 is redirected towards outcoupler area 640. In this way, several duplicates of light 632-1 will be formed traveling spatially separate towards outcoupler area 640. A similar discussion applies to expander area 636, where several duplicates of light 632-2 are formed traveling spatially separate towards outcoupler area 640.

Outcoupler area 640 includes a plurality of holographic outcouplers 650 aligned atop one another, such as holographic outcouplers 208, 216, 218, 226, 230, 322, 326, 516, 526, or 536 described above. In the example of FIG. 6, outcoupler area 640 includes a holographic outcoupler responsive to red light, a holographic outcoupler responsive to green light, and a holographic outcoupler responsive to blue light. Light from both expander area 634 and 636 impinges upon holographic area 640, which redirects the light from the expander areas out of waveguide 602. Similar to expander area 634 and expander 636, outcoupler area 640 may outcouple less than 100% of light which impinges thereon, such that remaining light which is not outcoupled will continue to travel through outcoupler area 640 by total internal reflection. Subsequently, when this remaining light again impinges on a respective holographic outcoupler in outcoupler area 640, another portion of the light can be outcoupled. In this way, several duplicates of the display light can be outcoupled from waveguide 602 in spatially separate locations. This forms a display with multiple spatially separate duplicate exit pupils, and thus a larger eye box compared to a single exit pupil.

Although FIG. 6 illustrates separate expander area 634 and expander area 636 which each receive different subsets of display light 632, in some implementations a single expander area could be utilized, where all of the display light 632 is directed towards the single expander area. Having separate expander areas advantageously allows each expander area to be specifically tuned for the wavelengths of display light which will be directed towards it, whereas having a single expander area can advantageously reduce the required size of the waveguide.

FIGS. 7-13 illustrate embodiments of optical combiners including transparent carrier or lens structures carrying a waveguide to be positioned in a field of view of a user. Although FIGS. 7-13 illustrate a waveguide 1002 which can correspond to one of waveguides 116 or 118, detailed in FIG. 1 or any of the waveguides described herein, such as waveguide 202 shown in FIG. 2, waveguide 302 shown in FIG. 3, waveguide 402 in FIG. 4, waveguide 502 shown in FIG. 5, or waveguide 602 shown in FIG. 6. Further, each of the transparent carriers illustrated in FIGS. 7-13 are shown as curved carriers, with one surface of each carrier being convex, and an opposing surface of each carrier being concave. In cases where the transparent carrier is split into two components, one component has a convex surface, and the other component has a concave surface. However, any of the described transparent carriers could be planar, such as in the example of FIG. 13.

Figure 7:
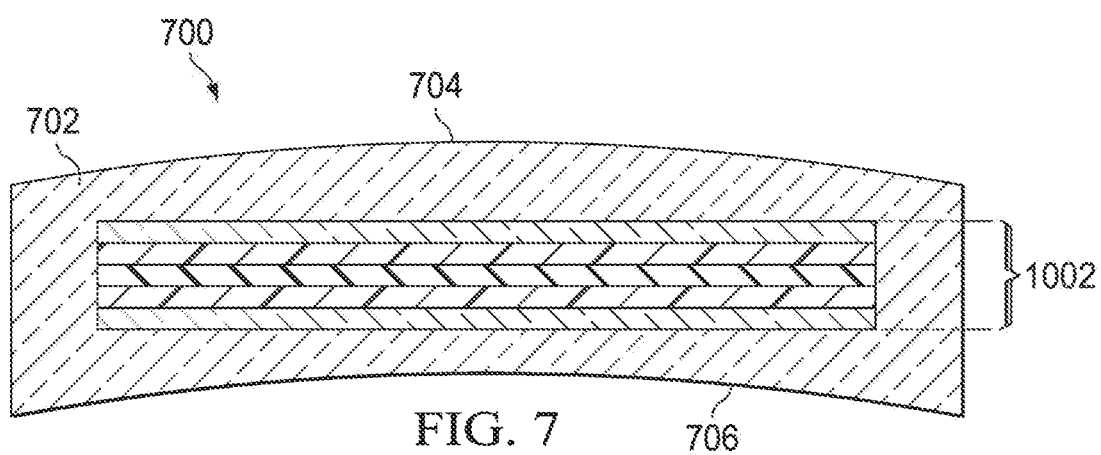
FIGS. 7-13 are top cutaway views of optical combiners in which a waveguide is carried by a transparent carrier in accordance with some embodiments.

FIG. 7 is a top cutaway view of an optical combiner 700, which includes a waveguide 1002 embedded in a transparent carrier 702. The transparent carrier 702 can be formed around waveguide 1002 so as to fully encase waveguide 1002 within transparent carrier 702. For example, transparent carrier 702 can be molded as a lens around waveguide 1002. Further, transparent carrier 702 is shown as having a curved convex surface 704, and a curved concave surface 706 on an opposite side of optical combiner 700 from curved convex surface 704. Similar convex and concave surfaces are included in other optical combiner implementations discussed below.

Figure 8:
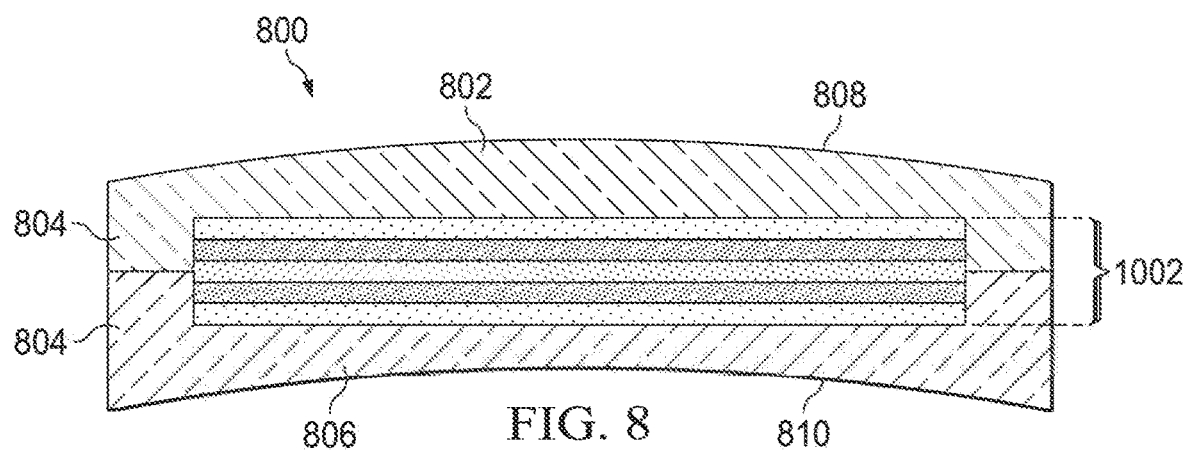

FIG. 8 is a top cutaway view of an optical combiner 800, which includes waveguide 1002 embedded between a first component 802 of a transparent carrier 804 and a second component 806 of transparent carrier 804. First component 802 and second component 806 can be formed separately and affixed together around waveguide 1002, such as with adhesive or mechanical fasteners. Further, the first component 802 includes a curved convex surface 808 and second component 806 includes a curved concave surface 810 on an opposite side of optical combiner 800 from curved convex surface 808.

FIGS. 7 and 8 both show waveguide 1002 as directly contacting the surrounding transparent carriers 702, 804. However, to maintain TIR at the boundaries of waveguide 1002, the index of refraction for the material outside of the waveguide 1002 should be less than the index of refraction of the boundary material of the waveguide 1002. This is achieved by forming transparent carrier 702 or transparent carrier 804 from a material of lower refractive index than the outermost layers of the waveguide 1002.

Figure 9:
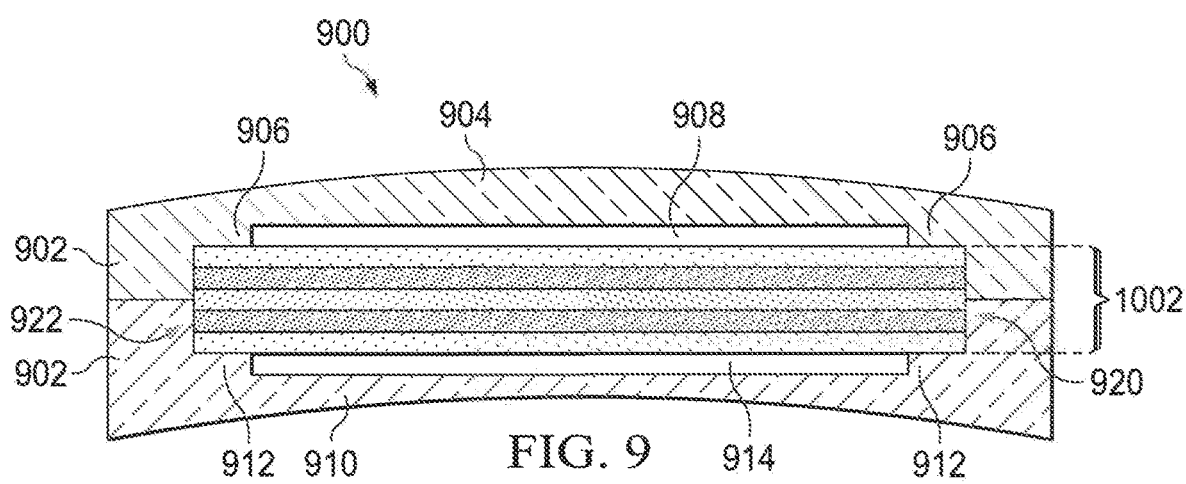

FIG. 9 is a top cutaway view that illustrates an optical combiner 900 which includes a waveguide 1002 embedded in a transparent carrier 902. Transparent carrier 902 can be structured to include an air gap between waveguide 1002 and the material which constitutes the transparent carrier 902. Because air has a low refractive index, an air gap between waveguide 1002 and transparent carrier 902 will improve the efficiency of waveguide 1002 by improving TIR within waveguide 1002. A first component 904 of transparent carrier 902 includes at least one support 906 region in contact with waveguide 1002. The remainder of first component 904 not in contact with support region 906 is spatially separated from waveguide 1002, resulting in an air gap 908. Similarly, a second component 910 of transparent carrier 902 includes at least one support 912 which contacts waveguide 1002. The rest of the second component 910 can be spatially separate from waveguide 1002, resulting in an air gap 914.

The support regions 906, 912 are shown in FIG. 9 as contacting the edges of waveguide 1002. This could be achieved by each of support regions 906, 912 being formed to partially wrap around vertical edges 920, 922 of waveguide 1002, or by each of support regions 906, 912 having a plurality of separate supports which contact different areas of waveguide 1002. Such supports are not limited to being positioned at vertical edges 920, 922 of the waveguide 1002. For example, one or more supports (not shown) could be positioned closer to the center of waveguide 1002, to provide greater stability and strength to maintaining air gaps 908 and 914.

Figure 10:
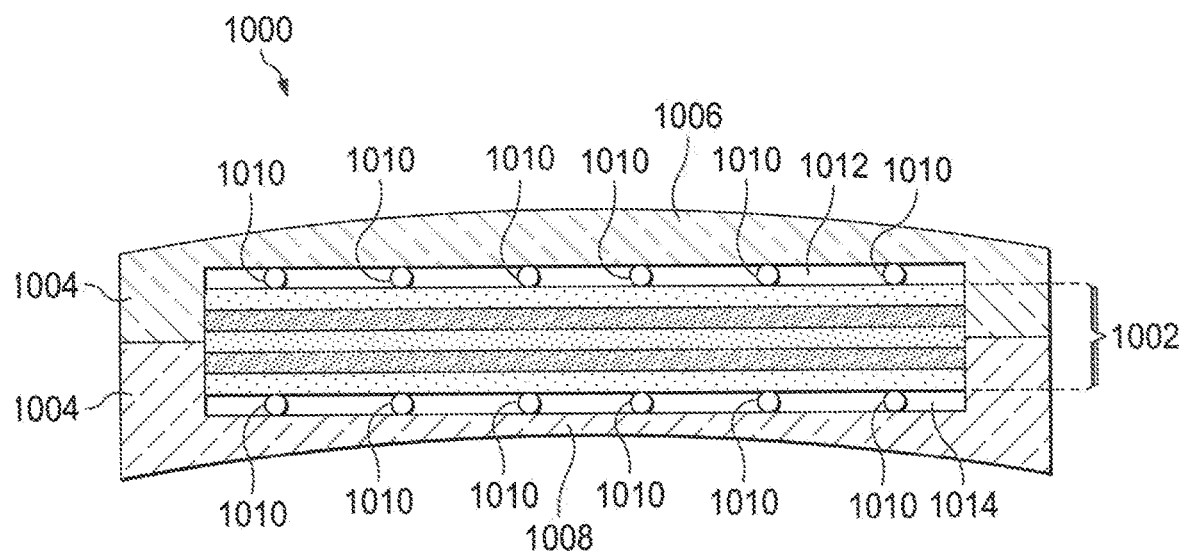

FIG. 10 is a top cutaway view illustrating an optical combiner 1000 which includes a waveguide 1002 embedded in a transparent carrier 1004. Transparent carrier 1004 includes a first component 1006 and a second component 1008 which surround waveguide 1002. A plurality of beads 1010 can be positioned between first component 1006 and waveguide 1002, to maintain an air gap 1012 therebetween. Similarly, a plurality of beads 1010 can be positioned between second component 1008 and waveguide 1002 to maintain an air gap 1014 therebetween. Beads 1010 can be made of, for example, glass or plastic, or the same material from which first or second components 1006 or 1008 are formed.

Figure 11:
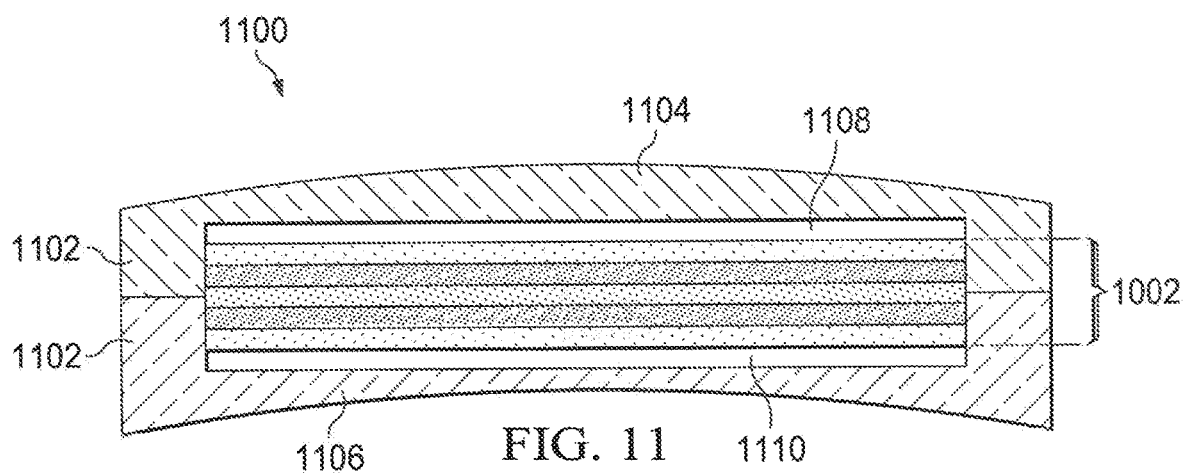

FIG. 11 is a top cutaway view illustrating an optical combiner 1100 which includes a waveguide 1002 embedded in a transparent carrier 1102. Transparent carrier 1102 includes a first component 1104 and a second component 1106 which surround waveguide 1002. The optical combiner 1100 includes a first separation layer 1108 and a second separation layer 1110. The first separation layer 1108 is positioned between first component 1104 and waveguide 1002 and is made of low-refractive index material having a lower refractive index than that of the outermost layer of waveguide 1002 to optimize TIR within waveguide 1002. Similarly, the second separation layer 1110 made of low-refractive index material is positioned between the second component 1106 and waveguide 1002 to optimize TIR within waveguide 1002.

Figure 12:
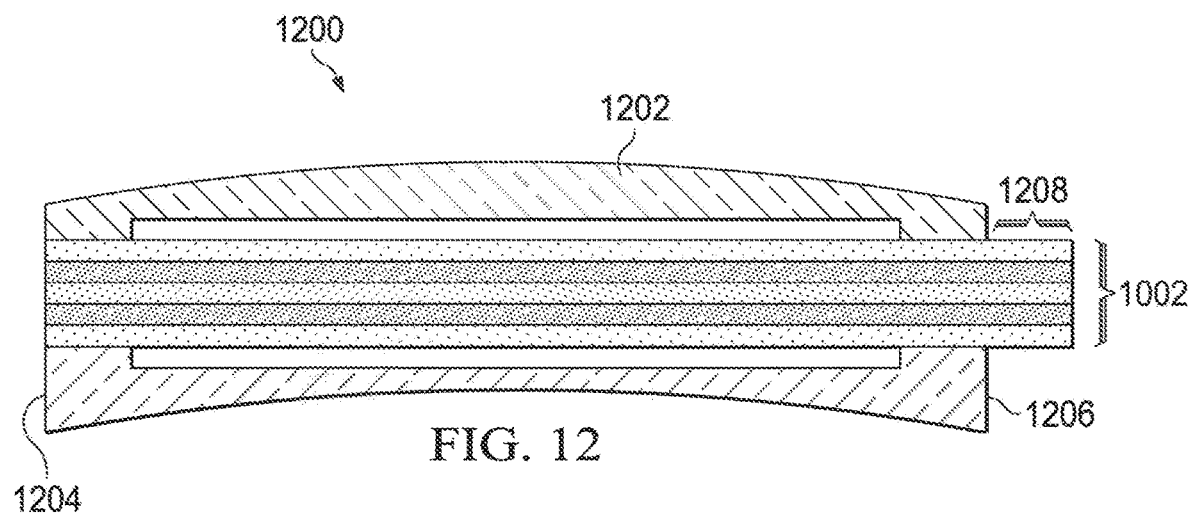

FIG. 12 is a top cutaway view illustrating an optical combiner 1200 which includes a waveguide combiner 1002 embedded in a transparent carrier 1202. Optical combiner 1200 can include any of the features of the optical combiners 700, 800, 900, 1000, or 1100 discussed above with reference to FIGS. 7-11, however, the size of waveguide 1002 is larger relative to the transparent carrier 1202 than in the previously discussed optical combiners. For example, FIG. 12 illustrates waveguide 1002 extending the entire length of transparent carrier 1202, starting flush with a first edge 1204 of transparent carrier 1202 and extending beyond a second edge 1206 of transparent carrier 1202. An incoupler area can be provided in the portion 1208 of waveguide 1002 which extends beyond edge 1206 of transparent carrier 1202, which provides for more direct incoupling of display light into waveguide 1002.

Figure 13:
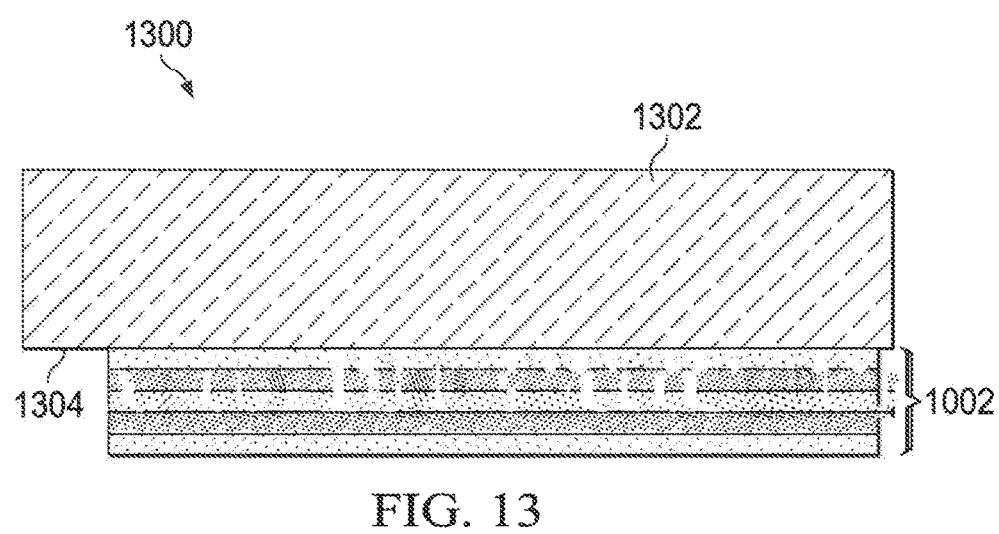

FIG. 13 is a top cutaway view that illustrates an optical combiner 1300 which includes a waveguide 1002 carried by a transparent carrier 1302. Transparent carrier 1302 can be planar as shown in FIG. 13, with waveguide 1002 affixed to a surface 1304 of transparent carrier 1302. For example, a first transparent layer or second transparent layer, such as the first and second transparent layers 260, 270 of waveguide 202 shown in FIG. 2, is affixed to surface 1304 of transparent carrier 1302, such as with adhesive or mechanical fasteners. Although FIG. 13 shows waveguide 1002 as covering only a subsection of surface 1304 of transparent carrier 1302, waveguide 1002 could instead cover the entire surface 1304, or could even extend beyond the surface 1304, similar to the waveguide 1002 illustrated in FIG. 12.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc , magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A waveguide comprising:
a first photopolymer layer;
a second photopolymer layer;
a first barrier layer disposed between the first photopolymer layer and the second photopolymer layer;
a first transparent layer; and
a second transparent layer, wherein the first photopolymer layer, the first barrier layer, and the second photopolymer layer are disposed between the first transparent layer and the second transparent layer.

2. The waveguide of claim 1, wherein:
the first photopolymer layer has a first holographic incoupler and a first holographic outcoupler recorded therein, the first holographic incoupler and the first holographic outcoupler responsive to light having a wavelength in a first waveband and unresponsive to light having a wavelength outside the first waveband; and
the second photopolymer layer has a second holographic incoupler and a second holographic outcoupler recorded therein, the second holographic incoupler and the second holographic outcoupler responsive to light having a wavelength in a second waveband and unresponsive to light having a wavelength outside the second waveband, the second waveband different from the first waveband.

3. The waveguide of claim 2, wherein:
the first holographic incoupler is positioned and oriented to redirect first light having a wavelength in the first waveband to totally internally reflect within a volume of the waveguide towards the first holographic outcoupler;
the first holographic outcoupler is positioned and oriented to receive the first light from the first holographic incoupler, and to redirect the first light to exit the volume of the waveguide;
the second holographic incoupler is positioned and oriented to redirect second light having a wavelength in the second waveband to totally internally reflect within the volume of the waveguide towards the second holographic outcoupler; and
the second holographic outcoupler is positioned and oriented to receive the second light from the second holographic incoupler, and to redirect the second light to exit the volume of the waveguide.

4. The waveguide of claim 3, wherein:
the first photopolymer layer has a third holographic incoupler and a third holographic outcoupler recorded therein, the third holographic incoupler and the third holographic outcoupler responsive to light having a wavelength in a third waveband and unresponsive to light having a wavelength outside the third waveband, the third waveband different from the first waveband and the second waveband;
the third holographic incoupler is positioned and oriented to redirect third light having a wavelength in the third waveband to totally internally reflect within the volume of the waveguide towards the third holographic outcoupler; and
the third holographic outcoupler is positioned and oriented to receive the third light from the third holographic incoupler, and to redirect the third light to exit the volume of the waveguide.

5. The waveguide of claim 4, wherein the first waveband, the second waveband, and the third waveband do not overlap.

6. The waveguide of claim 4, wherein:
the first photopolymer layer and the second photopolymer layer are parallel to each other;
the first holographic incoupler, the second holographic incoupler, and the third holographic incoupler are aligned with one another along a first axis orthogonal to the first photopolymer layer and the second photopolymer layer; and
the first holographic outcoupler, the second holographic outcoupler, and the third holographic outcoupler are aligned with one another along a second axis orthogonal to the first photopolymer layer and the second photopolymer layer.

7. The waveguide of claim 1, wherein each of the first photopolymer layer, the second photopolymer layer, the first barrier layer, the first transparent layer, and the second transparent layer have a same index of refraction, and light which totally internally reflects within a volume of the waveguide reflects off an outermost surface of the first transparent layer and an outermost surface of the second transparent layer.

8. The waveguide of any claim 1, further comprising:
a third photopolymer layer; and
a second barrier layer disposed between the second photopolymer layer and the third photopolymer layer, wherein the second barrier layer and the third photopolymer layer are disposed between the first transparent layer and the second transparent layer.

9. The waveguide of claim 8 wherein:
the first photopolymer layer has a first holographic incoupler and a first holographic outcoupler recorded therein, the first holographic incoupler and the first holographic outcoupler responsive to light having a wavelength in a first waveband and unresponsive to light having a wavelength outside the first waveband;
the second photopolymer layer has a second holographic incoupler and a second holographic outcoupler recorded therein, the second holographic incoupler and the second holographic outcoupler responsive to light having a wavelength in a second waveband and unresponsive to light having a wavelength outside the second waveband, the second waveband different from the first waveband; and
the third photopolymer layer has a third holographic incoupler and a third holographic outcoupler recorded therein, the third holographic incoupler and the third holographic outcoupler responsive to light having a wavelength in a third waveband and unresponsive to light having a wavelength outside the third waveband, the third waveband different from the first waveband and the second waveband.

10. The waveguide of claim 9 wherein:
the first holographic incoupler is positioned and oriented to redirect first light having a wavelength in the first waveband to totally internally reflect within the a volume of the waveguide towards the first holographic outcoupler;
the first holographic outcoupler is positioned and oriented to receive the first light from the first holographic incoupler, and to redirect the first light to exit the volume of the waveguide;
the second holographic incoupler is positioned and oriented to redirect second light having a wavelength in the second waveband to totally internally reflect within the volume of the waveguide towards the second holographic outcoupler; and
the second holographic outcoupler is positioned and oriented to receive the second light from the second holographic incoupler, and to redirect the second light to exit the volume of the waveguide;
the third holographic incoupler is positioned and oriented to redirect third light having a wavelength in the third waveband to totally internally reflect within the volume of the waveguide towards the third holographic outcoupler; and
the third holographic outcoupler is positioned and oriented to receive the third light from the third holographic incoupler, and to redirect the third light to exit the volume of the waveguide.

11. The waveguide of claim 1, wherein each of the first photopolymer layer, the second photopolymer layer, the first barrier layer, the first transparent layer, and the second transparent layer are planar.

12. A waveguide comprising:
a first transparent layer;
a first photopolymer layer carried by the first transparent layer; a barrier layer carried by the first photopolymer layer;
a second photopolymer layer carried by the barrier layer; and
a second transparent layer carried by the second photopolymer layer.

13. The waveguide of claim 12 wherein:
the first photopolymer layer has a first holographic incoupler and a first holographic outcoupler recorded therein, the first holographic incoupler and the first holographic outcoupler responsive to light having a wavelength in a first waveband and unresponsive to light having a wavelength outside the first waveband; and
the second photopolymer layer has a second holographic incoupler and a second holographic outcoupler recorded therein, the second holographic incoupler and the second holographic outcoupler responsive to light having a wavelength in a second waveband and unresponsive to light having a wavelength outside the second waveband, the second waveband different from the first waveband.

14. The waveguide of claim 13 wherein:
the first holographic incoupler is positioned and oriented to redirect first light having a wavelength in the first waveband to totally internally reflect within the a volume of the waveguide towards the first holographic outcoupler;
the first holographic outcoupler is positioned and oriented to receive the first light from the first holographic incoupler, and to redirect the first light to exit the volume of the waveguide;
the second holographic incoupler is positioned and oriented to redirect second light having a wavelength in the second waveband to totally internally reflect within the volume of the waveguide towards the second holographic outcoupler; and
the second holographic outcoupler is positioned and oriented to receive the second light from the second holographic incoupler, and to redirect the second light to exit the volume of the waveguide.

15. The waveguide of claim 14 wherein:
the first photopolymer layer has a third holographic incoupler and a third holographic outcoupler recorded therein, the third holographic incoupler and the third holographic outcoupler responsive to light having a wavelength in a third waveband and unresponsive to light having a wavelength outside the third waveband, the third waveband different from the first waveband and the second waveband;
the third holographic incoupler is positioned and oriented to redirect third light having a wavelength in the third waveband to totally internally reflect within the volume of the waveguide towards the third holographic outcoupler; and
the third holographic outcoupler is positioned and oriented to receive the third light from the third holographic incoupler, and to redirect the third light to exit the volume of the waveguide.

16. The waveguide of claim 15 wherein the first waveband, the second waveband, and the third waveband do not overlap.

17. The waveguide of claim 15, wherein:
the first photopolymer layer and the second photopolymer layer are parallel to each other;
the first holographic incoupler, the second holographic incoupler, and the third holographic incoupler are laterally aligned with one another; and
the first holographic outcoupler, the second holographic outcoupler, and the third holographic outcoupler are laterally aligned with one another.

18. The waveguide of claim 12, wherein each of the first photopolymer layer, the second photopolymer layer, the barrier layer, the first transparent layer, and the second transparent layer have a same index of refraction, and light which totally internally reflects within a volume of the waveguide reflects off an outermost surface of the first transparent layer and an outermost surface of the second transparent layer.

19. The waveguide of claim 12, wherein each of the first photopolymer layer, the second photopolymer layer, the barrier layer, the first transparent layer, and the second transparent layer are planar.

20. The waveguide of claim 12, wherein the waveguide is disposed between a first curved surface and a second curved surface of a transparent carrier material to form an optical combiner.

* * * * *